Oct. 1, 1946.  W. M. SHAW  2,408,691
FORCED DRAFT FLOOR HEATER
Filed Oct. 29, 1942  4 Sheets-Sheet 1

INVENTOR.
Walter M. Shaw
BY M. Y. Charles
ATTORNEY

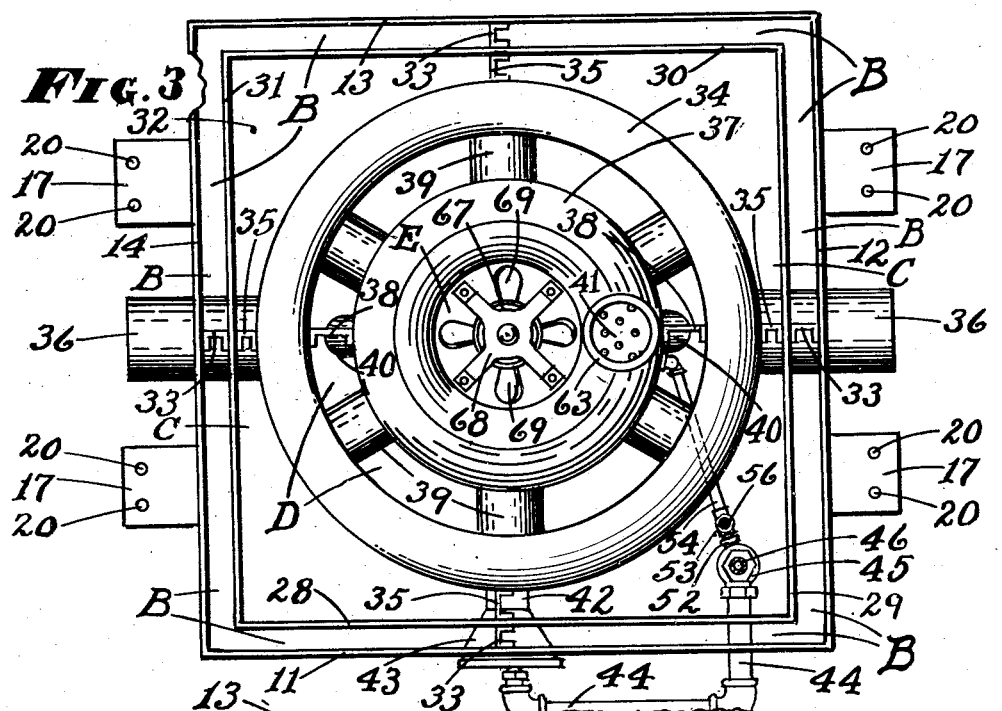
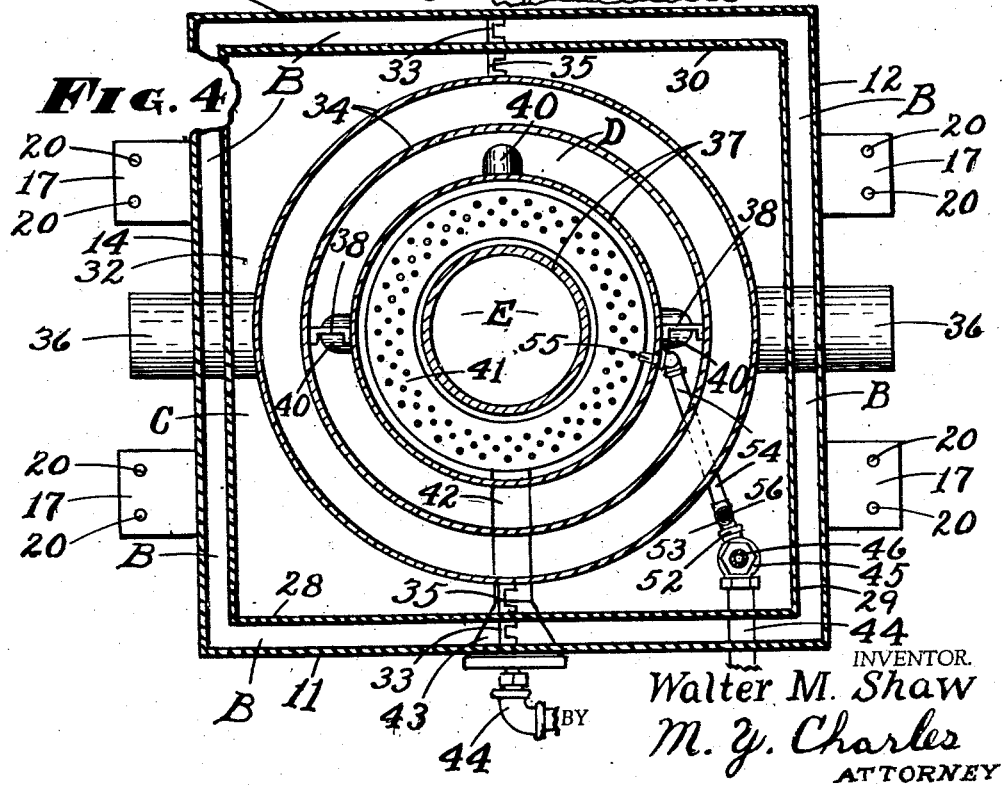

Oct. 1, 1946.  W. M. SHAW  2,408,691
FORCED DRAFT FLOOR HEATER
Filed Oct. 29, 1942  4 Sheets-Sheet 3
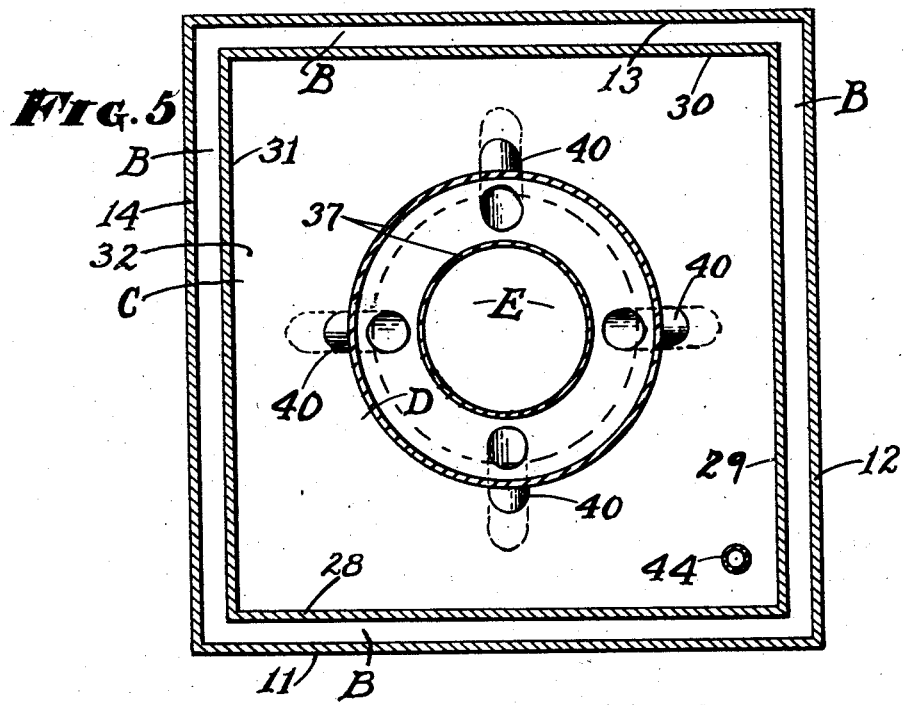
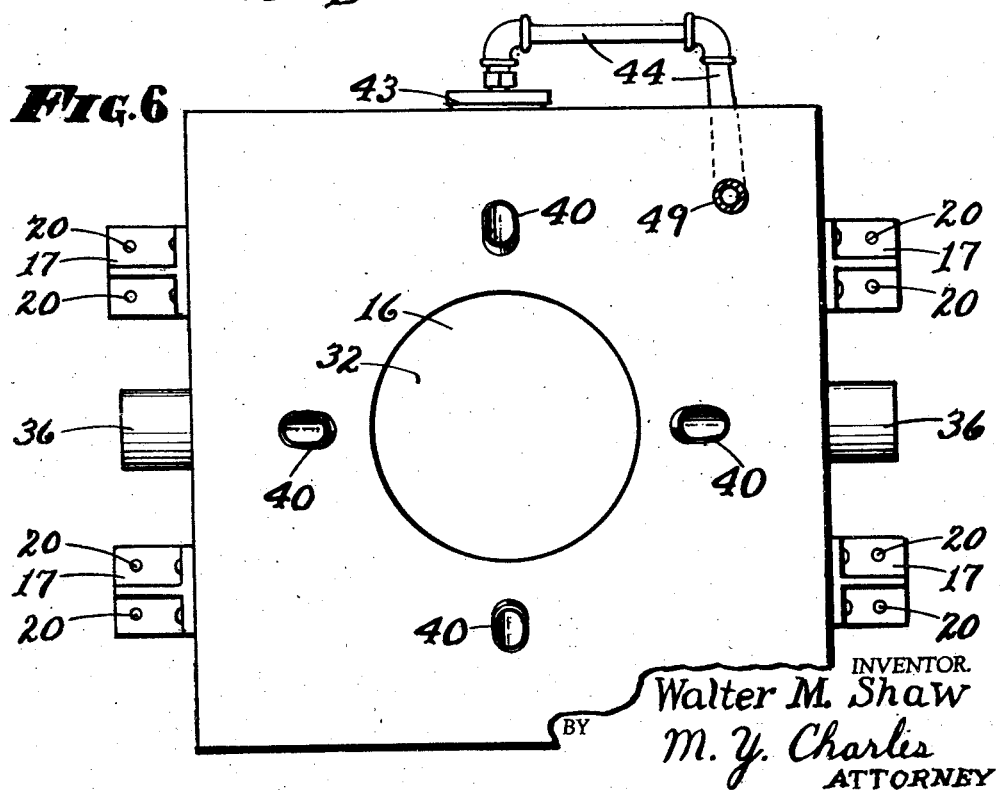
INVENTOR.
Walter M. Shaw
M. Y. Charles
ATTORNEY Oct. 1, 1946. W. M. SHAW 2,408,691
FORCED DRAFT FLOOR HEATER
Filed Oct. 29, 1942 4 Sheets-Sheet 4
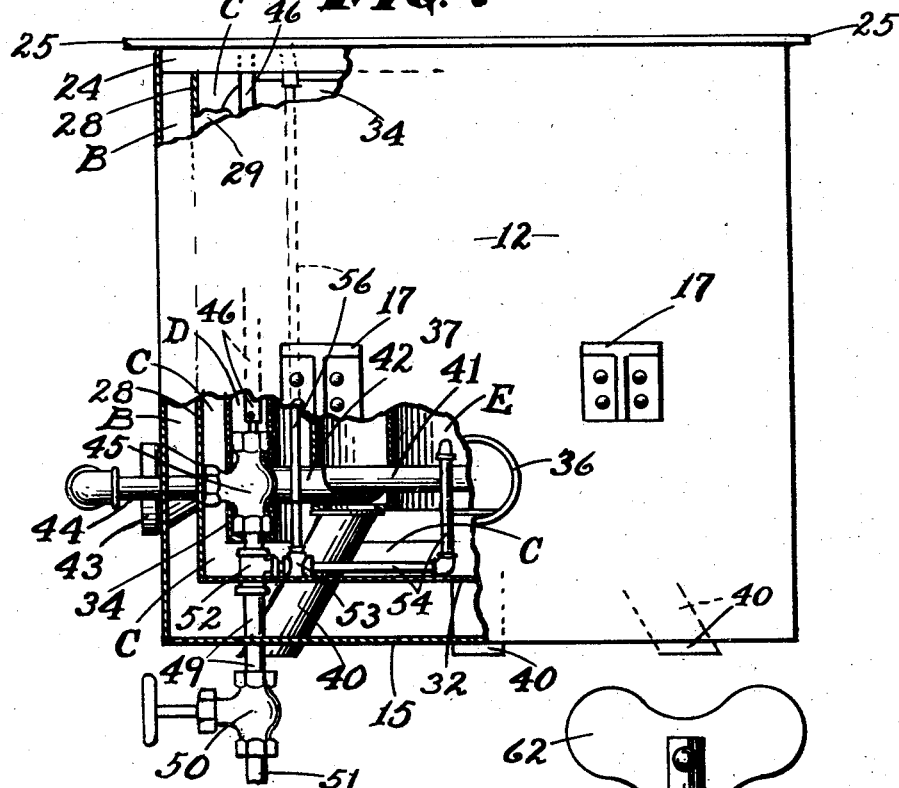
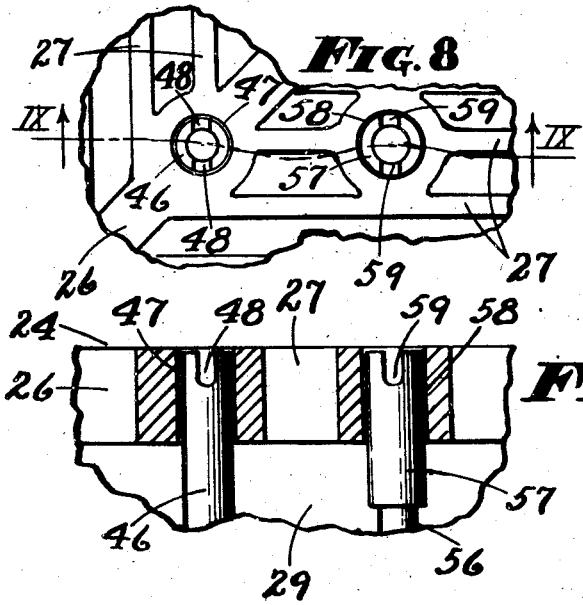
INVENTOR.
Walter M. Shaw
BY M. Y. Charles
ATTORNEY Patented Oct. 1, 1946

2,408,691

UNITED STATES PATENT OFFICE 2,408,691

FORCED DRAFT FLOOR HEATER

Walter M. Shaw, Arkansas City, Kans.

Application October 29, 1942, Serial No. 463,769

4 Claims. (Cl. 126—110)

My invention relates to an improvement in forced draft floor heaters and has for its object to provide a floor heater that has a forced draft of heated air that will be distributed for long distances along the floor instead of immediately rising into the space to be heated.

A further object is to provide a heater of the kind mentioned that is not too large and still has an abundance of heating area therein to secure a high efficiency in the process of heating the air that is to be discharged into the space to be heated, and at the same time supply fresh air to the space being heated.

A still further object is to provide a heater of the kind mentioned that is simple in construction, easy to install, and inexpensive to build. These and other objects will be more fully described as this description progresses.

Now referring to the accompanying drawings:

Fig. 3 is a top plan view of the heater device, the floor grill being removed for convenience of illustration.

Fig. 4 is a horizontal detail sectional view of the heater device, the view being taken along the line IV—IV in Fig. 1.

Fig. 5 is a horizontal detail sectional view of the heater device, the view being taken along the line V—V in Fig. 1.

Fig. 6 is a bottom plan view of the heater device.

Fig. 7 is a view of the right side of the device as shown in Fig. 1.

Fig. 8 is an enlarged detail plan view of that portion of the floor grill from where the valves controlling the main burner and the pilot light are controlled.

Fig. 9 is a detail sectional view taken along the line IX—IX in Fig. 8.

Fig. 10 is a detail view of the key used in operating the valves for the control of the main burner and the pilot light.

Similar numerals of reference designate the same parts throughout the several figures of the drawings.

Figure 1:
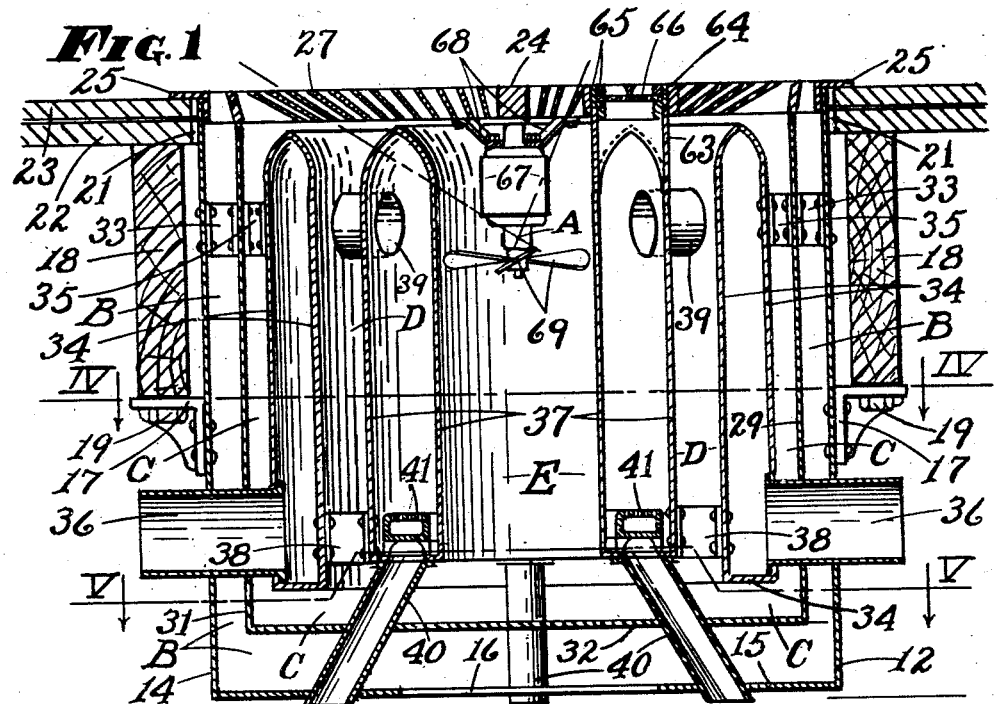
Fig. 1 is a vertical detail sectional view through the floor heater device.
Figure 2:
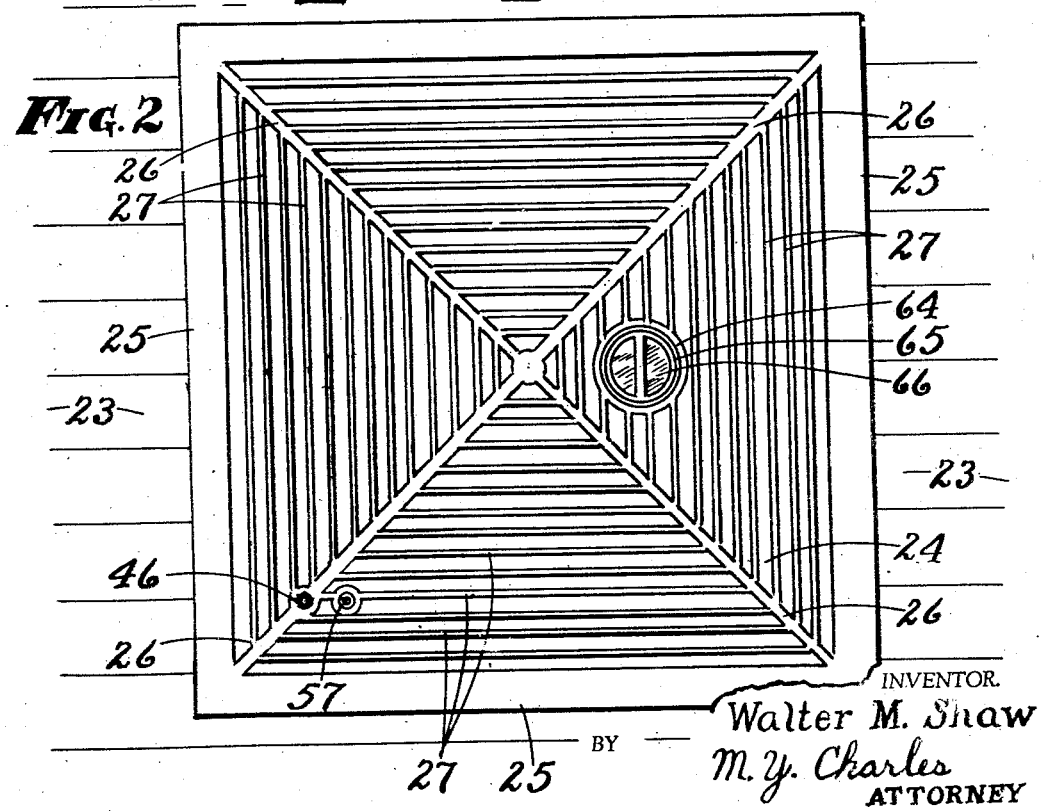
Fig. 2 is a top plan view of the heater device shown in Fig. 1.

In the drawings is shown my improved forced draft floor heater which comprises a box like element having four sides 11, 12, 13, and 14 and a bottom 15. Centrally positioned in the bottom 15 is a large hole 16. The sides 12 and 14 are provided with hanger brackets 17 by which the device may be supported. The brackets 17 are attached to the floor joists or other suitable supporting elements 18 by means of lag screws 19 which pass through holes 20. The upper edges of the walls 11, 12, 13 and 14 extend through a hole 21 in the sub-floor 22 and finished floor 23.

The box like element 11—12—13—14—15 is covered by a grill 24 that is of considerable thickness and is surrounded by a flange portion 25 that is an integral part of the grill and rests on the finished floor 23 with the body portion of the grill seated within the upper portion of the walls 11, 12, 13 and 14 of the box like element.

The construction of the grill is preferably that of a one piece grill having diagonally disposed support members 26 between which are positioned vanes 27 that are set in sloping positions radiating from a point such as at A, the object of which will later be made obvious.

Within the box like element 11—12—13—14—15 is positioned a second box like element having four side walls 28, 29, 30 and 31 and a bottom 32. The box like element 28—29—30—31—32 is small enough that its side walls and bottom are spaced away from the side walls and bottom of the first said box like element so as to leave a cool air space B between the sides and bottoms of the two box like elements. The space B is maintained by means of spacer elements 33 that are positioned between the walls of the two box like elements and rigidly fastened thereto by rivets or welding or any other suitable means.

Within the second said box like element is a secondary circular shaped heating drum 34 spaced away from the walls and bottom of the second said box like element by means of spacer elements 35 so as to provide a warm air passage C between the walls and bottom of the second said box like element and the outside wall and bottom of the secondary heating drum 34. At the bottom of the secondary heating drum and diametrically positioned thereacross and opening thereinto and extending outwardly therefrom and extending through the side walls of the box like elements are two tubular vents 36 for connection to a flue.

Positioned within the circle of the secondary heating drum and spaced away from the inner wall thereof is a circular shaped primary heating drum 37 that is held in position by means of spacer elements 38 so as to form a second warm air passage D. At the upper or top portion of the secondary and primary heating drums 34 and 37 is a plurality of pipes 39 radially spaced around and connecting between the two drums for purposes that will later be made obvious.

Connecting with the interior of the primary heating drum 37 and at the bottom thereof is a plurality of air intake pipes 40 that extend downwardly and pass through the bottoms 15 and 32 of the said box like elements.

Within the primary heating drum 37 and at the bottom thereof is positioned a circular shaped burner, preferably a gas burner 41, having a mixed air and gas supply pipe 42 and an air and gas mixer 43 that is supplied with gas fuel through the feed pipe 44 under the control of the gas valve 45 the stem of which is provided with a tubular extension element 46 the upper end of which is journalled in a bearing 47 formed in the grill 24. The upper end of the tubular element 46 is provided with diametrically positioned notches 48 to receive an operating key as will later be described.

The control valve 45 is fed fuel through the supply pipe 49 in which is positioned a cut-off valve 50 that is fed through the pipe 51.

In the pipe line 49 and between the valves 45 and 50 is a T-pipe fitting 52 that feeds gas fuel through a valve 53 and a pipe line 54 to a gas jet 55 that functions as a pilot light burner for the main burner 41.

The stem of the gas valve 53 is provided with an extension element 56 the upper end of which is provided with a tubular portion 57 that is journalled in a bearing 58 that is formed in the grill 24. The upper end of the tubular portion 57 is provided with diametrically positioned notches 59 to receive a key as will later be described. The key mentioned is as shown in Fig. 10 and comprises a shaft 60 tapered at its lower end as at 60a and having a cross pin 61 that projects on either side of the shaft 60 as shown. The upper end of the shaft 60 is provided with wing elements 62, by which the shaft may be turned as will later be described. The shaft 60 is just small enough to be easily received in the tubular elements 46 and 57 and the pin 61 will be seated in the notches 48 or 59 so that when the key is turned the shafts 46 or 56 will likewise be turned to open or close their respective valve 45 or 53 as will be readily understood.

On the upper edge of the primary heating drum is formed an upwardly extending tubular portion 63 that opens into the primary heating drum 37 and over the pilot jet 55. The upper end of the tubular element 63 is seated in a circular formation 64 provided in the grill 24. The tubular element 63 is provided with a cover element 65 that is seated within the circular formation 64 and rests on the upper end of the tubular element 63. The closure element 65 has a transparent element 66 to permit inspection of the flame of the main burner 41 and pilot light jet 55. The opening through the tubular element 63 will also serve as a means through which the pilot light may be lighted as will be readily understood.

The face bounded by the primary heating drum 37 forms an air passage E that connects with the space C beneath the heating drums 34 and 37.

In the upper portion of the air passage E is positioned an electric motor 67 that is supported on a spider bracket 68 that is rigidly attached to and supported by the grill 24. Rigidly attached to the revolvable shaft of the motor 67 is a fan element 69.

The operation of the heater device is as follows: To start the heater the master valve 50 is opened and the electric motor and fan 67—69 is started. The closure element 65 is removed from over the tubular element 63 and the key F is placed in the element 57 and turned to open the valve 53 whereupon a lighted torch may be passed through the tubular element 63 to light the pilot light at the jet 55. The pilot light having then been lighted, the closure element 65 is now replaced to close the tubular element 63. This having been done, the key F is now placed in the tubular element 46 and turned to open the valve 45 whereupon the mixed air and gas fuel is admitted to the main burner 41 and is emitted therefrom and ignited by the pilot light. The main burner having thus been lighted, the size of the flame therefrom may be adjusted by the degree the control valve 45 is opened or closed by the use of the key F.

Secondary air for the support of the flame from the burner is admitted through the air intake pipes 40 and provides a heated draft that flows upwardly through the primary heating drum thence outwardly through the tubes 39 into and downwardly through the secondary heating drum and out through the tubes 36 to a suitable flue and during which flow of draft the large heating surface of both sides, top and bottom of the heating drums 37 and 34 is heated from the heated draft passing therethrough.

Simultaneously with the action just described the fan 69 draws air inwardly through the grill 24 from the room or space being heated and projects the air downwardly through the space E whereupon a static pressure is raised in the passages D and C within the second said box like element and the air flows upwardly between the heating drums 37 and 34 and around the outside of the heating drum 34 and is discharged through the grill 24, the air becoming heated during the travel just described.

Due to the inclination of the vanes 27 of the grill 24 the flow of the draft of warm air emitted therethrough is similarly directed, and at the outer edges of the grill it will be noted that flow of heated air is directed well toward the horizontal position of the floor 23 and directly across the top of the passage B and by reason of which air is siphoned therefrom and the siphoned air is replaced by fresh cool air through the opening 16 in the bottom of the first said box like element. This air, being cool, will have a tendency to drop to and flow along the floor 23 and in so doing will tend to draw to it and carry with it the warm air being discharged thereover as above described. The result of this action is that the draft of cool air provides a carrier for the warm air and carries the heated air for long distances along the floor line to effect a uniform heating of the space to be heated and the temperature of the space being heated will vary but very little between the floor and the ceiling of the room or space being heated.

While the heating effect just described is quite desirable and that which is intended it will also be noticed that the heater device also provides a continuous flow of fresh outside air which is also desirable and important to the health and good feeling of the occupants of the room or space being heated.

Such modifications of my invention may be employed as lie within the scope of the appended claims without departing from the spirit and intention of my invention. Now having fully shown and described my invention, what I claim is:

1. A force draft floor heater comprising inner and outer casings having open upper ends, said casings having their side and bottom walls spaced apart, the bottom wall of the outer casing having an opening therein, inner and outer hollow annular drums within the inner casing, the inner drum defining a central air passage, said drums being spaced from each other to provide an annular space therebetween, said drums being spaced above the bottom wall of the inner casing, pipes connecting the spaces within the drums at the upper ends thereof with each other, vents leading from the outer drum, means for supplying fresh air to the lower end of the inner drum, burner means in the space within the inner drum, a power fan in the upper end of said air passage to force air downwardly and beneath the lower ends of the drums and thence upwardly through the annular space therebetween, a grill covering the open upper ends of the respective casings including vanes having their longitudinal axes lying substantially in a plane of the grill, the faces of the vanes being inclined upwardly and outwardly to direct air from the inner casing across the space between the upper open ends of the casings.

2. A heater of the class described comprising inner and outer casings having open upper ends and their side walls spaced apart, the inner casing being closed at its bottom and the outer casing having an open bottom, means for furnishing heat to the inner casing, a grill covering the open upper ends of the respective casings and including vanes having their longitudinal axis lying substantially in a plane of the grill, a power fan centrally mounted in the upper end of the inner casing for forcing therefrom in a downwardly direction centrally within the inner casing and upwardly around the side walls of said inner casing, said vanes serving to direct air across the span defined between the upper ends of the inner and outer casings.

3. A heater of the class described, comprising inner and outer casings having open upper ends, said casings having their side and bottom walls spaced apart, the bottom wall of the outer casing having a fresh air entrance opening therein, means for furnishing heat to the inner casing, a power fan mounted centrally in the upper end of the inner casing for drawing air into the upper end thereof and forcing the air downwardly centrally of said inner casing around the side walls of said inner casing and through the upper end thereof, a grill covering the open upper ends of the casings, and including vanes having their longitudinal axis lying substantially in a plane of the grill, the faces of the vanes being inclined upwardly and outwardly and disposed in the upper end of the inner casing to direct air from the inner casing across the space between the upper open ends of the casings.

4. A force draft floor heater comprising inner and outer casings having open upper ends, said casings having their side and bottom walls spaced apart, the bottom of the outer casing having an opening therein, inner and outer hollow drums within the inner casing, the inner drum defining a central air passage, said drums being spaced apart from each other to provide an annular air passage therebetween, and said outer drum being spaced inwardly from the side walls of said inner casing to provide space between it and said inner casing, pipes connecting the spaces within the drums at the upper ends thereof with each other, vents leading from the outer drum, means for supplying fresh air to the lower end of the inner drum, burner means in the space within the inner drum, a power fan in the upper end of said air passage to force air downwardly and beneath the lower ends of the drums and thence upwardly through the annular space therebetween and through the space between the outer drum and wall of the inner casing, a grill covering the open upper ends of the casings and including vanes having their longitudinal axis lying substantially in a plane of the grill, the faces of the vane being inclined upwardly and outwardly to direct air from the inner casing across the space between the upper open ends of the casings.

WALTER M. SHAW.